United States Patent [19]

Gibson

[11] Patent Number: 5,005,391

[45] Date of Patent: Apr. 9, 1991

[54] VEHICLE ANTI-THEFT DEVICE

[76] Inventor: Gerald L. Gibson, FM 772 W., P.O. Box 1202, Kingsville, Tex. 78363

[21] Appl. No.: 590,738

[22] Filed: Oct. 1, 1990

[51] Int. Cl.⁵ .......................................... E05B 65/12
[52] U.S. Cl. ..................................... 70/238; 70/203; 70/212
[58] Field of Search .................. 70/238, 239, 201–203, 70/209, 210, 211, 212, 225–227

[56] References Cited

U.S. PATENT DOCUMENTS

| | | | |
|---|---|---|---|
| 1,193,679 | 8/1916 | Fox | 70/238 |
| 3,190,090 | 6/1965 | Zaidener | 70/203 |
| 3,550,409 | 12/1970 | Pariser | 70/203 |
| 3,690,131 | 9/1972 | Davis | 70/203 |
| 3,898,823 | 8/1975 | Ludeman | 70/200 |
| 4,699,238 | 10/1987 | Tamir | 180/287 |
| 4,779,435 | 10/1988 | Farrow | 70/238 |
| 4,829,797 | 5/1989 | Wu | 70/209 |
| 4,959,901 | 10/1990 | Davidson | 70/238 |

FOREIGN PATENT DOCUMENTS 941212  11/1963  United Kingdom ................. 70/238

Primary Examiner—Robert L. Wolfe
Attorney, Agent, or Firm—Fulbright & Jaworski

[57] ABSTRACT

An anti-theft device which may be connected between the steering wheel and one of the floor controls for immobilizing the use of the vehicle. An elongated body has a first end having a connection for engaging one of the floor controls and the second end includes first and second jaws with a plurality of spaced generally parallel dividers for providing an adjustable connection for locking to the steering wheel.

5 Claims, 2 Drawing Sheets

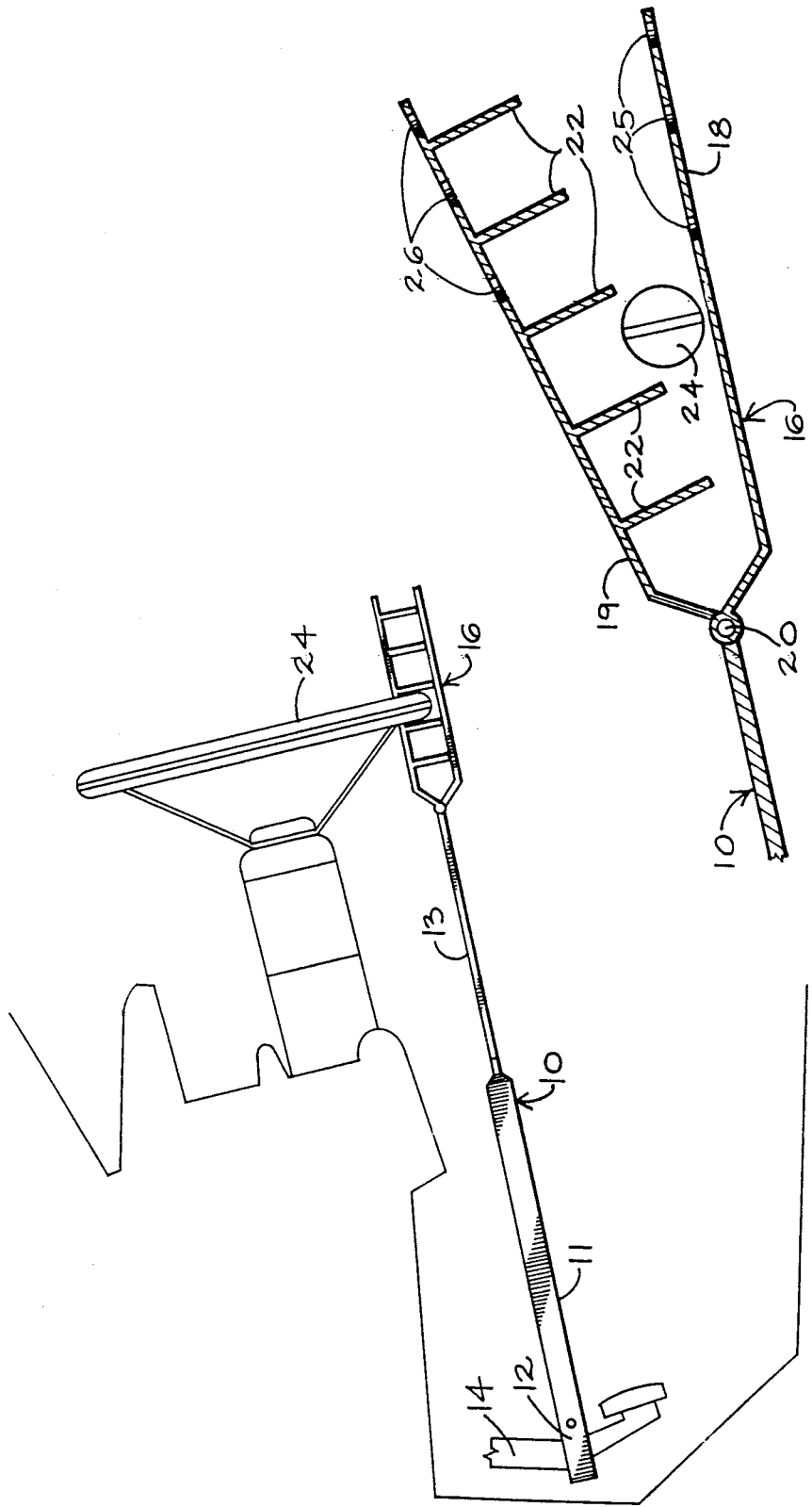

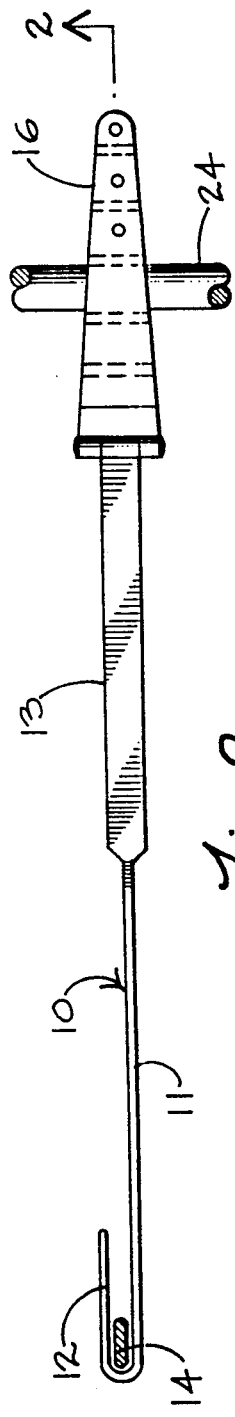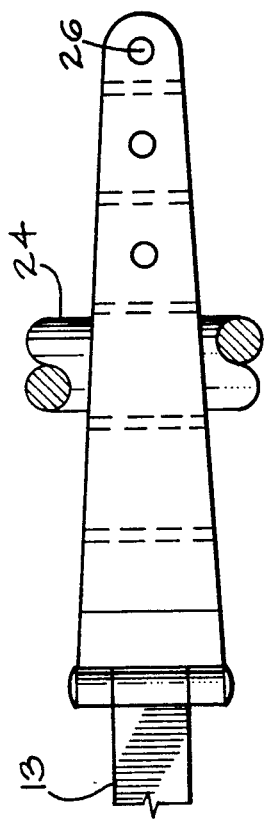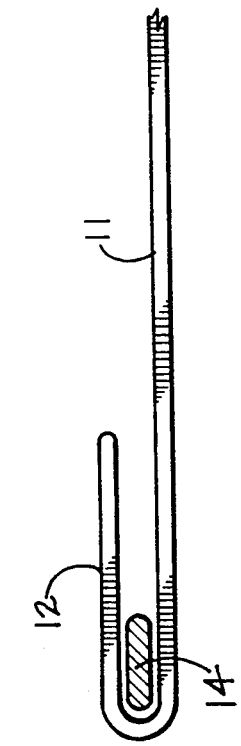

VEHICLE ANTI-THEFT DEVICE

BACKGROUND OF THE INVENTION

It is known to provide a vehicle anti-theft device which may be locked between the steering wheel and a floor control of a vehicle. However, such devices are complicated, expensive to manufacture, and consequently are not in wide-spread use to combat and reduce the increasing crime of automobile theft.

The present invention is an easy to manufacture, inexpensive, and simple to use device. Furthermore, the present anti-theft device is easily adjustable for accommodating the different distances between floor controls such as a brake, clutch or gas pedal, and the steering wheel in different kinds of vehicles, including but not limited to those vehicles with tilt steering wheels.

SUMMARY

The present invention is directed to a vehicle anti-theft device for connection between the steering wheel and one of the floor controls, such as a brake, clutch or gas petal, for immobilizing the use of the vehicle. The device includes an elongate body having first and second ends in which the first body includes a connection for engaging one of the floor controls and the second end includes first and second jaws, one of which is pivotly connected to the body. A plurality of spaced generally parallel dividers are positioned between the jaws and connected to one of the jaws thereby providing an adjustable connection for attachment to a steering wheel. Means are provided on both of the jaws for receiving lock means for locking the jaws together and to the steering wheel.

A still further object of the present invention are wherein the means for receiving lockmeans includes holes for receiving a pad lock.

Still a further object of the present invention is wherein one of the jaws is fixed to the body.

Yet a still further object is wherein the dividers are connected to the movable jaw for ease in accommodating various distances between the steering wheel and the floor controls.

Yet a further object is the provision of a body having two flat portions rotationaly offset from each other for positioning the ends for connection to the vehicle. Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 1 is a fragmentary elevational view of the use of the device in a vehicle,

FIG. 2 is an enlarged cross-sectional view of one end of the present device,

FIG. 3 is a top elevational view of the device of the present invention in place connected between a floor control and a steering wheel, FIG. 4 is an enlarged top view of the first end of the present engaging a floor control, and FIG. 5 is a top elevational view of the second end of the device.

DESCRIPTION OF A PREFERRED EMBODIMENT

Referring now to the drawings and particularly to FIG. 1, the reference numeral 10 generally indicates the anti-theft device of the present invention having a first end 12 for engaging one of the floor pedals of a vehicle and a second end 16 for attachment to a steering wheel 24 of a vehicle for immobilizing the use of the vehicle.

Referring now to FIGS. 1 and 3, the device 10 has a body which included a first flat portion 11 and a second flat portion 13. The first portion 11 is connected to the end 12 and the second portion 13 is connected to the end 16. The flat portions 11 and 13 are rotationally offset from each other approximately 90° along the longitudinal axis of the body 10. This provides a simple, inexpensive body structure for correctly aligning the first end 12 and the second end 16 for attachment to a floor control 14 and a wheel 24, respectively.

The first end 12 includes a connection for engaging one of the floor controls. For example only, the connection 12 at the first end may simply be a hook for engaging a floor control shaft 14 which may be either a brake, a clutch or a gas petal, here shown as a brake.

The second end 16 includes a first jaw 18 and a second jaw 19, one of which is pivotly connected to the body 10. Preferably, the jaw 18 is fixed relative to the body 10 and the jaw 19 is pivotly connected to the body 10 about the pivot pin 20. Thus, the jaws 18 and 19 are movable towards and away from each other for enclosing a portion of the steering wheel 24.

One of the jaws such as the movable jaw 19 includes a plurality of partitions 22 forming dividers for allowing a steering wheel 24 to fit therein. This provides a device 10 which may accommodate the distance between the floor pedal 14 and the steering wheel 24 in various vehicles, including those with tilt steering wheels.

Means are provided on both of the jaws 18 and 19 for receiving lock means for locking the jaws together. Preferably, the lock means may include a plurality of spaced holes 25 and 26 in the jaws 18 and 19, respectively, for receiving a pad lock, although a built in lock may be provided, if desired.

In use, the first or hooked end 12 is inserted around the floor control 14 and the jaws 18 and 19 are positioned to enclose a part of the steering wheel 24 as best seen in FIG. 2, the wheel 24 will fit between a pair of partitions 22. The different partitions 22 are provided to accommodate differing distances between the steering wheel 24 and the floor control 24. After shutting the jaws 18 and 19, a lock is inserted through one pair of holes 25 and 26 to act as a deterrent to a would-be thief.

The present vehicle anti-theft device is simple to construct, inexpensive, adjustable, and easy to use.

The present invention, therefore, is well adapted to carry out the objects and attain the ends and advantages mentioned as well as others inherent therein. While a presently preferred embodiment of the invention have been given for the purpose of disclosure, numerous changes in the details of construction and arrangement of parts will be readily apparent to those skilled in the art and which are encompassed with the spirit of the invention and the scope of the appended claims.

What is claimed is:

1. A vehicle anti-theft device for connection between the steering wheel and one of the floor controls such as a brake, clutch or gas pedal for immobilizing the use of the vehicle comprising, an elongate body having first and second ends, said first end including a connection for engaging one of the floor controls, said second end including first and second jaws, one of the jaws pivotly connected to the body, a plurality of spaced generally parallel dividers positioned between the jaws and connected to one of the jaws thereby providing an adjustable connection for attachment to a steering wheel, and means on both said jaws for receiving lock means for locking said jaws together.

2. The apparatus of claim 1, wherein the means for receiving lock means includes holes for receiving a pad lock.

3. The apparatus of claim 1, wherein one of the jaws is fixed to the body.

4. The apparatus of claim 3, wherein the dividers are connected to the movable jaw.

5. The apparatus of claim 1, wherein the body includes a first flat portion connected to the first end and a second flat portion connected to the second end, said portions being rotationally offset from each other along the longitudinal axis of the body.

* * * * *